United States Patent [19]
Köhler et al.

[11] Patent Number: 5,599,862
[45] Date of Patent: Feb. 4, 1997

[54] GRAFT POLYMERS WITH IMPROVED SURFACE GLOSS

[76] Inventors: Burkhard Köhler, Mündelheimer Str.94, 47829 Krefeld; Werner Tischer, Am Norfbach 9, 41542 Dormagen; Karl-Erwin Piejko, Unterscheider Weg 7a, 51467 Bergisch Gladbach, all of Germany

[21] Appl. No.: 449,480

[22] Filed: May 30, 1995

[30] Foreign Application Priority Data

Jun. 10, 1994 [DE] Germany .......................... 44 20 307.1

[51] Int. Cl.⁶ .............................. C08K 5/24; C08L 51/00; C08G 63/48; C08F 283/00
[52] U.S. Cl. ..................... 524/262; 524/264; 524/265; 524/267; 524/504; 525/64; 525/71; 525/474
[58] Field of Search ..................... 524/262, 264, 524/265, 267, 504; 525/64, 63, 65, 71, 79, 474

[56] References Cited

U.S. PATENT DOCUMENTS

| | | | |
|---|---|---|---|
| 4,412,032 | 10/1983 | Gaske et al. | 524/538 |
| 4,895,891 | 1/1990 | Schumann et al. | 524/493 |
| 5,354,796 | 10/1994 | Creecy et al. | 524/114 |
| 5,468,714 | 11/1995 | Oshima et al. | 503/227 |

FOREIGN PATENT DOCUMENTS

| | | |
|---|---|---|
| 2467867 | 4/1981 | France . |
| 3427208 | 2/1986 | Germany . |

*Primary Examiner*—Paul R. Michl
*Assistant Examiner*—LaVonda R. DeWitt

[57] ABSTRACT

The invention relates to a mixture of
(A) ABS graft polymer and
(B) 0.05 to 2% by weight (based on the mixture) of a polyether- or polyester-grafted silicone
with improved surface gloss.

4 Claims, No Drawings

GRAFT POLYMERS WITH IMPROVED SURFACE GLOSS

In the context of the present invention, an ABS graft polymer (A) is understood to be a material consisting of A1) 0 to 90 parts by weight, preferably 10 to 80 parts by weight and more preferably 20 to 75 parts by weight of one or more thermoplastic homopolymers, copolymers or terpolymers synthesized from polymerized vinyl monomers selected from styrene, α-methyl styrene, nucleus-substituted styrene, methyl methacrylate, acrylonitrile, methacrylonitrile, maleic anhydride, N-substituted maleic imide, vinyl acetate and mixtures thereof and A2) 10 to 100 parts by weight, preferably 90 to 20 parts by weight and more preferably 25 to 80 parts by weight of one or more graft products of A2$_1$) 5 to 90 parts by weight and preferably 30 to 80 parts by weight of styrene, α-methyl styrene, nucleus-substituted styrene, methyl methacrylate, acrylonitrile, methacrylonitrile, maleic anhydride, N-substituted maleic imide, vinyl acetate or mixtures thereof on A2$_2$) 95 to 100 parts by weight and preferably 70 to 20 parts by weight of a rubber having a glass temperature of $\leq 10°$ C.

Products A1) and A2) are known and are described in more detail, for example, in DE-OS 3 808 844.

Preferred graft products in the context of the invention are graft products of styrene and acrylonitrile on polybutadiene, 50 to 90% by weight of styrene and 10 to 50% by weight of acrylonitrile generally being present in the mixture of the graft monomers. The graft products generally contain 10 to 30% by weight of polybutadiene in the form of small particles. The polybutadiene is generally crosslinked. These graft products can be obtained by polymerization of styrene and acrylonitrile in the presence of a polybutadiene latex. In general, the graft product is already a mixture of free styrene/acrylonitrile copolymer and rubber particles onto which styrene and acrylonitrile are graft-polymerized. The rubber content of this product can be adjusted to the required value by addition of separately prepared styrene/acrylonitrile copolymer. This mixture is referred to herein as graft polymer.

ABS graft polymers are known. Summary accounts can be found in Ullmann's Enzyklopädie, Vol. 19, pages 277 et seq. and in Roempp's Chemielexikon, 8th Edition, 1987, Vol. 2, pages 25 et seq.

These products which are used as thermoplastic molding compounds have an inadequate surface gloss for certain applications.

It has been found that the addition of a small quantity of polyether- or polyester-grafted—preferably polyether-grafted—silicones (B) distinctly increases the gloss of ABS polymers (A).

These silicones correspond to the following formula:

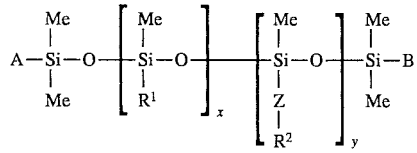

in which

R$^1$ is an alkyl group containing 1 to 30 carbon atoms, up to 20% by weight of these alkyl groups being replaceable by phenyl and/or phenyl-alkenyl groups which may be substituted by one or more methyl groups, the alkenyl groups containing 1 to 3 carbon atoms, A is —CH$_3$ or R$^2$—Z—,
B is —CH$_3$ or R$^2$—Z—,
R$^2$ is a polyether unit or a polyester unit with an average molecular weight of 200 to 3000, preferably a polyether unit and, more preferably, a polyethylene oxide unit or polypropylene oxide unit,
Z is a difunctional group which joins the silicon atom to the group R$^2$,
x is a number of 3 to 250,
y is a number of 0 to 50,
the average molecule containing at least one group R$^2$—Z— and the ratio of the number of groups R$^2$—Z— to the number x being 1:2 to 1:40.

They are commercially available under the name of BYK® (manufacturer: BYK-Chemie GmbH, Wesel). The polyester-grafted silicones corresponding to formula (I) are described in DE-OS 3 427 208.

The symbol R$_1$ in formula I preferably stands for C$_{1-30}$ alkyl groups because the corresponding siloxanes can be produced from readily accessible starting materials. The choice of the alkyl groups depends to a large extent on the application envisaged for the siloxanes, taking the composition of the lacquers and molding compounds containing them into account. Siloxanes containing long alkyl groups are wax-like and are particularly suitable for powder-form lacquers and molding compounds. On the other hand, siloxanes containing lower alkyl groups are liquid or semi-solid and are more suitable for liquid lacquers or molding compounds. The physical consistency of the siloxanes is of course also determined by other parameters of formula (I), more particularly by the nature of the polyester groups. This will be commented upon hereinafter. Alkyl groups containing up to 18, preferably up to 12 and more preferably up to 8 carbon atoms are useful as such for the symbol R$_1$ because they have a better effect in regard to an increase in surface slip than siloxanes in which the symbol R$_1$ stands for alkyl groups containing a larger number of carbon atoms. The methyl group is particularly preferred for reasons of ready accessibility.

The alkyl groups may be partly replaced by phenyl and/or phenyl-alkylene groups which may be substituted by one or more methyl groups, the alkylene groups best containing 2 or 3 carbon atoms. The content of such phenyl and/or phenyl-alkylene groups is best less than 10% by weight, based on the total weight of alkyl groups and phenyl and/or phenyl-alkylene groups for which the symbol R$_1$ stands.

A key constituent of the siloxanes used in accordance with the invention are the groups R$_2$. These are carboxylic acid ester groups which do not contain any active H atoms, i.e. H atoms determinable by the Zerewittinoff reaction. They must contain at least 3 groups

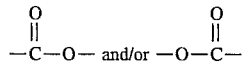

and have an average molecular weight of 200 to 3000.

These groups are preferably joined to one another by difunctional hydrocarbon groups containing 2 to 12 and preferably 4 to 6 carbon atoms. Saturated aliphatic hydrocarbon groups containing 5 carbon atoms are particularly preferred. The group R$_2$ is preferably a polycaprolactone group, i.e. a group formed by polymerization of caprolactone, as will be described in more detail herein-after.

Where A and B each represent an R$_2$—Z— group, y is best 0. In this case, the ratio between the number of R$_2$—Z— groups and the number x is preferably in the range from 1:3 to 1:40 and more preferably in the range from 1:3 to 1:15.

Where A and B each represent the group CH$_3$—, y is best a number of 1 to 50. In this case, the ratio between the number of R$_2$—Z— groups and the number x is preferably in the range from 1:10 to 1:20.

In order to produce the polyester-containing siloxanes used in accordance with the invention, functional siloxanes corresponding for example to formulae (II) to (X) below may be reacted by reaction mechanisms a) or b) described hereinafter (cf. EP-A 0 083 733):

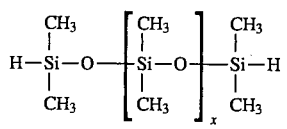 (II)

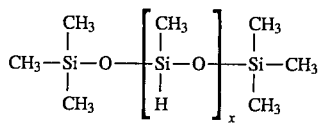 (III)

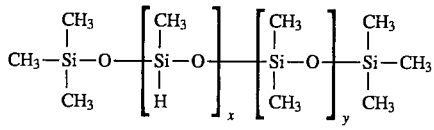 (IV)

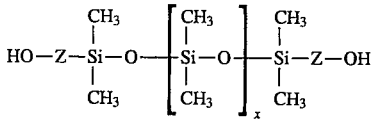 (V)

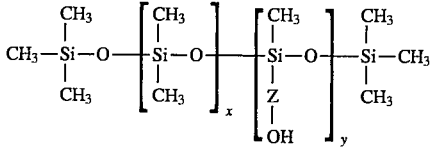 (VI)

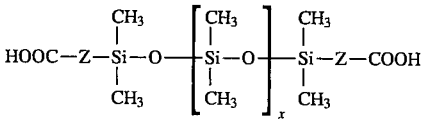 (VII)

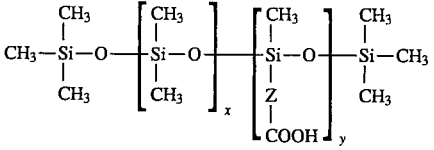 (VIII)

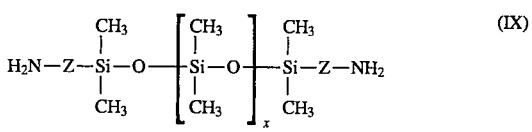 (IX)

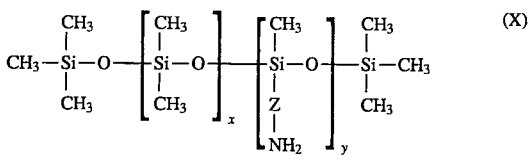 (X)

a) reaction with monofunctional carboxylic acid esters of which the functional group is capable of reacting with the functional groups of siloxanes corresponding, for example, to formulae (II) to (X) or b) further reaction at the functional groups of one of the siloxanes corresponding to formulae (II) to (X) by known methods which are suitable for forming polyesters Re a)

Monofunctional carboxylic acid esters capable of reacting with such functional siloxanes may be —OH, —COOH or —CH=CH$_2$-functional. Examples of OH-functional carboxylic acid esters are those which can be obtained, for example, by polymerization of a lactone, such as propiolactone, valerolactone, caprolactone or substituted derivatives thereof, using a monohydroxy compound as starting component. Examples of polymerizable lactones can be found in U.S. Pat. No. 4,360,643.

Monoalcohols best containing 3 to 30 and preferably 3 to 10 carbon atoms, such as n-propanol, n-butanol, relatively long-chain saturated alcohols, cyclohexanol and phenyl ethanol, are used as the starting component.

If unsaturated alcohols, such as allyl alcohol or 10-undecen-1-ol, are used in the polymerization of the lactone and if the terminal OH group formed is capped, for example, by acylation, alkylation or by reaction with monoisocyanates, polyesters containing an unsaturated terminal group are obtained.

The lactone polymerization described above—initiated for example by p-toluene sulfonic acid or dibutyl tin dilaurate—is carried out in known manner at temperatures of around 100° to 180° C. and obeys, for example, the following mechanism:

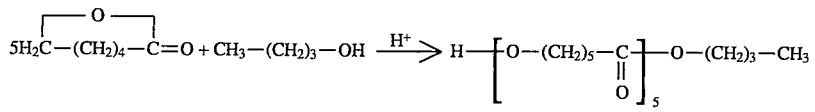

or

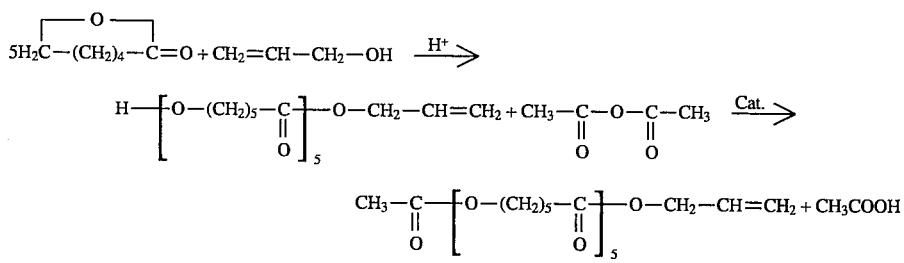

These carboxylic acid esters best have an average molecular weight of around 200 to 3000 and preferably in the range from 500 to 2000.

Hydroxy- and carboxy-monofunctional carboxylic acid esters of this type also include those obtainable by condensation of a diol, for example ethylene glycol, diethylene glycol, triethylene glycol, propylene glycol, butanediol, hexanediol, neopentyl glycol, dodecanediol and cyclohexane dimethanol, and a dibasic acid, such as maleic acid, succinic acid, adipic acid, sebacic acid, phthalic acid, hexahydrophthalic acid and tetrahydrophthalic acid, in the presence of monohydroxy compounds or monocarboxylic acids. The formation of dihydroxycarboxylic acid esters can be suppressed by the use of corresponding stoichiometric quantities of monohydroxy compounds of the type described above. Similarly, the formation of dicarboxy-functional carboxylic acid esters is suppressed when monocarboxylic acids are used in a corresponding stoichiometric ratio. The reaction takes place, for example, by the following mechanism:

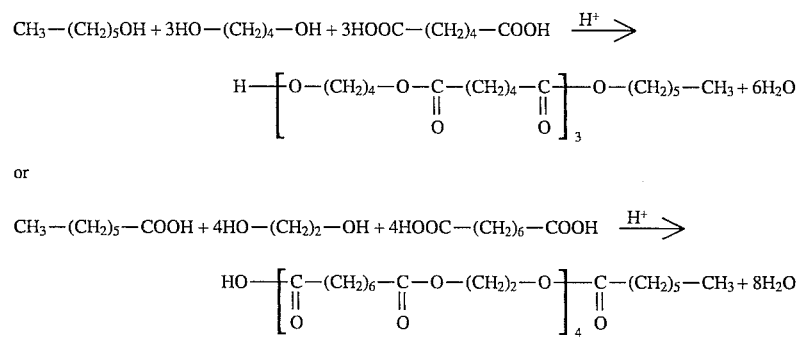

These carboxylic acid esters best have an average molecular weight of 200 to 2000 and preferably in the range from 500 to 1500.

In the case of an —OH or —COOH function, these monofunctional carboxylic acid esters are reacted with corresponding siloxanes in known manner in a condensation reaction accompanied by elimination of water or hydrogen, i.e. for example hydroxypolyesters are reacted with carboxyfunctional or SiH-functional siloxanes or carboxy-functional carboxylic acid esters are reacted with hydroxyfunctional or aminofunctional siloxanes to form an ester or amide bond.

The terminally unsaturated carboxylic acid esters are added onto SiH-functional siloxanes in known manner, for example using Pt catalysts. This reaction takes place for example by the following mechanism:

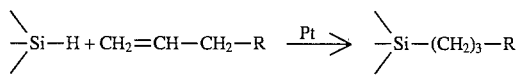

Re b)

A process suitable for forming polyesters is, for example, the ring-opening polymerization of lactones. In this process, hydroxyalkyl-functional polysiloxanes are directly reacted with lactones, such as propiolactone, valerolactone, caprolactone or substituted derivatives thereof, to form the polyester and the terminal OH group is acylated, alkylated, silylated or reacted with monoisocyanates.

The lactone polymerization is initiated by known methods, for example by dibutyl tin dilaurate, and carried out at temperatures of around 100° to 180° C. either in suitable solvents, such as high-boiling petroleum fractions, alkyl benzenes, esters or ketones, or directly in the melt.

The reaction products thus obtained contain terminal OH groups which must not be present in the siloxanes used in accordance with the invention because, as already mentioned, these siloxanes must not contain any active H atoms. Accordingly, these hydroxyl groups have to be converted into groups which do not contain any active hydrogen atoms. This may be done by acylation with, for example, acetic anhydride, alkylation with typical alkylating agents, such as benzyl chloride, or by urethanization with monoisocyanates, such as phenyl isocyanate, naphthyl isocyanate or butyl isocyanate, or by silylation, for example with hexamethyl disilazane.

The reaction as a whole takes place, for example, by the following mechanism:

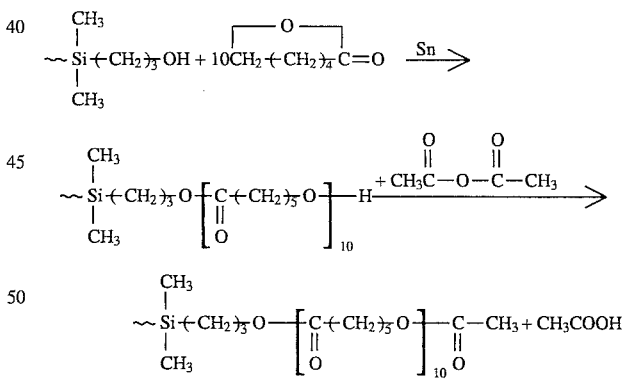

The polyesters produced by these processes best have a molecular weight of around 200 to 3000 and preferably in the range from 500 to 3000, compounds obtained by caprolactone polymerization as described above being preferred. α,ω-Bis-hydroxyalkyl siloxanes are preferably used as the starter siloxanes.

Other processes suitable for forming polyestercontaining siloxane are those which start out from hydroxy-, carboxy- or amino-functional polysiloxanes and which form polyesters by condensation of diols and dicarboxylic acids in the presence of monohydroxy or monocarboxy compounds.

To control molecular weight and to cap the terminal group, the monohydroxy compounds or monocarboxy compounds are reacted in the corresponding stoichiometric ratio. The reaction takes place, for example, by the following mechanism:

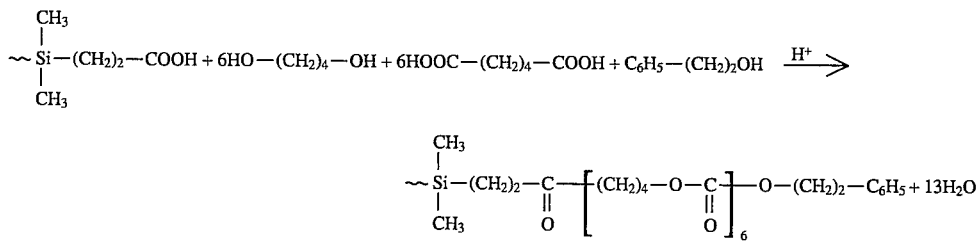

or, where aminofunctional siloxanes are used, by the following mechanism:

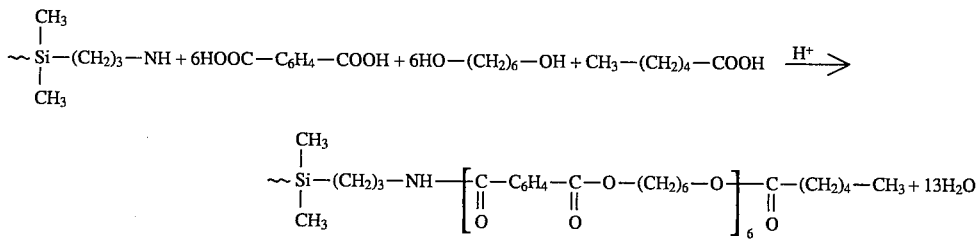

These polyesters best have an average molecular weight of around 200 to 3000 and preferably in the range from about 600 to 1500.

Selective compatibility with the polymers used as binders for the lacquers or molding compounds can be achieved by varying the synthesis of the polyester, such as the choice of the diols, dicarboxylic acids or lactones used and also the terminal groups and the number of ester groups. This plays an important part in particular in the case of binders of different polarity. Phthalic-acid-polyester modified siloxanes are also best used, for example, for binders based on phthalic acid polyesters. Caprolactone-polyester-modified siloxanes are particularly preferred because they are compatible with various polymer systems.

It follows from the foregoing observations that the aliphatic, cycloaliphatic and aromatic polyester groups used may be those of the type typically and preferably used in the prior art for the production of polyesters in the field of lacquers and molding compounds. Accordingly, aliphatic groups best contain 2 to 12 carbon atoms, diols containing 2 to 4 carbon atoms being preferred for reasons of cost while the dicarboxylic acids are best those containing 2 and 4 carbon atoms in the alkylene chain. The preferred cycloaliphatic group is the cyclohexane group while the preferred aromatic group is the phenylene group.

The function of the group Z is to join the silicon atom to the carboxylic acid ester group $R_2$. The nature of this divalent connecting group depends upon the starting products for the production of the siloxanes used in accordance with the invention and on the nature of the reaction, as known in siloxane chemistry (cf. inter alia U.S. Pat. No. 3,960,574, column 1). Examples of such difunctional connecting groups are alkylene groups, preferably containing 2 to 4, 10 or 11 carbon atoms because corresponding starting products are particularly readily accessible. The difunctional group may also be an oxygen atom or alkylene groups containing a thioether bond (—S—). Where aminofunctional siloxanes are used as starting materials, the connecting group is an alkyleneamide group.

When comb-like siloxanes, i.e. those in which y is not 0, are used, x should best have a value below about 100, preferably below about 50 and more preferably below about 30. x is preferably at least 4. In comb-like siloxanes such as these, the ratio between the number of $R_2$—Z— groups and the number x is preferably from 1:4 to 1:20.

Where y is 0, the siloxanes are so-called linear siloxanes in which the carboxylic acid ester groups are only present at both ends of the siloxane chain. In this case, x is a number of 4 to 100 and preferably 6 to 20.

The above formula (I) is an average formula of a polymer mixture. The groups appearing in square brackets in the formula are present in statistical distribution in the molecule.

The polyether-grafted silicones corresponding to formula I may or may not contain active hydrogen atoms. They are obtainable by hydrosilylation reactions of the SiH-functional siloxanes corresponding to formula II or III or IV with polyethers corresponding to formula XI:

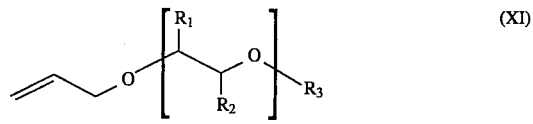

in which $R^1$ and $R^2$ represent hydrogen or $C_{1-6}$ alkyl and one of the substituents $R^1$ or $R^2$ must be hydrogen and $R^3$ is hydrogen, $C_{1-6}$ alkyl, $C_{7-14}$ aralkyl or $C_{6-14}$ aryl or an acyl group or carbamoyl group.

The polyethers corresponding to formula XI are obtainable by anionic polymerization of ethylene oxide and/or propylene oxide using allyl alcohol as initiator and, optionally, subsequent reaction with alkylating or acylating agents or with isocyanates or using alcohols or phenols as initiator and subsequent reaction with allyl halides.

During the subsequent reaction of polyethers having terminal allyl groups with silanes having SiH-groups branched products may be obtained as side-products in low amounts, as e.g. products wherein $R^3$=H can undergo a reaction wherein a silyl ether is formed with elimination of hydrogen.

In addition, the polyether-grafted silicones corresponding to formula I are obtainable by anionic polymerization of ethylene oxide and/or propylene oxide using hydroxyfunctional siloxanes corresponding to formula V or VI as initiator and, optionally, subsequent reaction with alkylating or acylating agents or isocyanates.

The present invention relates to mixtures of
(A) ABS graft polymers and
(B) 0.05 to 2% by weight and preferably 0.2 to 1% by weight (based on the mixture) of a grafted silicone corresponding to formula (I).

The mixtures according to the invention may be prepared by mixing in the melt in kneaders or extruders at temperatures of 180° to 260° C. and preferably at temperatures of 190° to 240° C.

By comparison with the pure ABS graft polymers, they show increased surface gloss, as measured with a Labotron Multigloss 2 laboratory reflectometer at an angle of 60°.

In many cases, particularly where polyether-grafted silicones are added, notched impact strength is also improved and static charging reduced. Silicones grafted with polyethylene oxide show particularly high activity in this regard.

EXAMPLES

The ABS plastic (A) consists of

| | |
|---|---|
| 30 parts by weight | of a graft polymer of 50 parts by weight of styrene and acrylonitrile in a ratio by weight of 72:28 on 50 parts by weight of particulate polybutadiene rubber (mean particle diameter $d_{50}$ = 400 nm) prepared by emulsion polymerization and |
| 70 parts by weight | of a styrene/acrylonitrile copolymer with a ratio by weight of styrene to acrylonitrile of 72:28 and an intrinsic viscosity of 0.55 dl/g (in DMF at 20° C.), |
| 1.5 parts by weight | of polyethylene oxide (antistatic agent), |
| 0.5 part by weight | of magnesium stearate and |
| 0.15 part by weight | of carbon black. |

Notched impact strength was tested in accordance with DIN 53543. Gloss was measured with a Labotron Multigloss 2 laboratory reflectometer at an angle of 60°.
Comparison The notched impact strength of the ABS plastic on its own is 12.2 kJ/m² while its gloss measures 89.6%.

Example 1

100 parts by weight of the ABS plastic are mixed with 1 part by weight of polyester-grafted silicone (BYK 310®, a product of Byk-Chemie). The notched impact strength measures 12.9 kJ/m² and the gloss 92.7%.

Example 2

100 Parts by weight of the ABS plastic are mixed with 1 part by weight of polyether-grafted silicone (BYK 302®, a product of Byk-Chemie). The notched impact strength measures 15.3 kJ/m² and the gloss 93.3%.

We claim:
1. A mixture consisting essentially of:
A) ABS graft polymer; and
B) 0.05 to 2% by weight, based on weight of mixture, of a polyether- or polyester-grafted silicone molecules of the formula

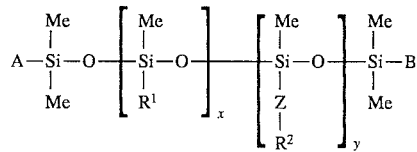

$R^1$ is an alkyl group containing 1 to 30 carbon atoms, up to 20% by weight of these alkyl groups being replaceable by phenyl and/or phenyl-alkenyl groups which may be substituted by one or more methyl groups, the alkenyl groups containing 1 to 3 carbon atoms,
A is —CH$_3$ or $R^2$—Z—,
B is —CH$_3$ or $R^2$—Z—,
$R^2$ is a polyether unit or a polyester unit with an average molecular weight of 200 to 3000,
Z is a difunctional group which joins the silicon atom to the group $R^2$,
X is a number of 3 to 250,
Y is a number of 0 to 50,
the average molecule containing at least one group $R^2$—Z— and the ratio of the number of groups $R^2$—Z— to the number x being 1:2 to 1.40.

2. The mixture of claim 1, wherein $R^2$ is a polyether unit.
3. The mixture of claim 1, wherein $R^2$ is a polyethylene oxide unit.
4. The mixture of claim 1, wherein $R^2$ is a polypropylene oxide unit.

* * * * *